(No Model.)
C. E. CHALLIS.
COOKING UTENSIL.
No. 578,389.　　　　　　　　Patented Mar. 9, 1897.
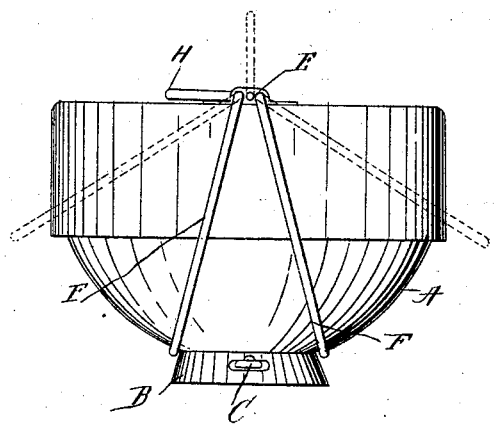
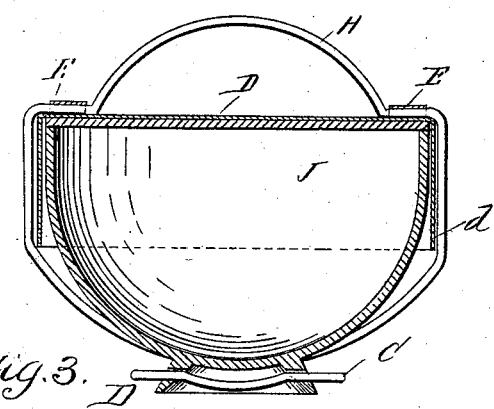
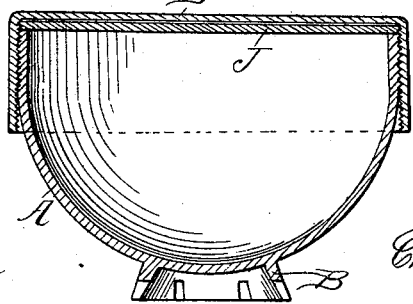
WITNESSES:
John Buckler
C Gerst
INVENTOR
Charles E. Challis,
BY
Edgar Tate & Co
ATTORNEYS.
THE NORRIS PETERS CO., PHOTO-LITHO., WASHINGTON, D. C.

UNITED STATES PATENT OFFICE.

CHARLES EBENEZER CHALLIS, OF LONDON, ENGLAND.

COOKING UTENSIL.

SPECIFICATION forming part of Letters Patent No. 578,389, dated March 9, 1897.

Application filed February 14, 1896. Serial No. 579,219. (No model.) Patented in England October 20, 1893, No. 19,771.

*To all whom it may concern:*

Be it known that I, CHARLES EBENEZER CHALLIS, a citizen of Great Britain, and a resident of 74 Amherst Park, London, England, have invented certain new and useful Improvements in Cooking Utensils, of which the following is a specification, reference being had to the accompanying drawings, forming a part thereof, in which similar letters of reference indicate corresponding parts, and which has been patented in England under No. 19,771, dated October 20, 1893.

This invention relates to cooking utensils; and the object thereof is to provide an improved device for cooking various puddings and other foods that will exclude the water and allow for the expansion of the pudding without employing the customary pudding-cloth.

The invention is fully disclosed in the following specification, of which the accompanying drawings form a part, in which—

Figure 1 is a side view of my improved cooking vessel. Fig. 2 is a vertical section thereof. Fig. 3 is a section similar to Fig. 2, showing the threaded connection of the cover and bowl, as also the serration in the rim-flange.

In the practice of my invention the bowl or vessel A for containing the substance to be cooked may vary considerably in shape, but preferably has an externally-convex bottom and slightly-tapering sides. A ring-flange or feet B are made upon the outside of the bottom of the bowl and channeled, serrated, or distorted in such manner as to permit the free circulation of water underneath, and may be shaped as to serve as a handle or as a base for the attachment of a handle C, whereby the bowl or vessel may be held safely when inverted for the purpose of ejecting the pudding. A disk or plate J may be placed over the mouth of the bowl or vessel to prevent any contact or sticking of the pudding to the cover hereinafter described. I also provide a cap or cover D, which is a cylinder with a closed end, the sides being of such depth that when the cover is inverted over the mouth of the bowl (being of slightly larger diameter than the bowl) the water in which the vessel is immersed is prevented from rising to the mouth of the bowl or vessel owing to the air or vapor imprisoned under the cover, and when desired a flexible ring may be inserted around the cover of the bowl to avoid the possibility of the water splashing over the bowl during violent ebullition.

The cover D may be attached to the bowl by means of a thread formed on the outer surface of the bowl and a corresponding thread formed on the inner surface of the sides of cover, or other suitable means, such as bayonet-joints, hooks, and lugs, or other devices; or I may provide two ears, tubes, or keepers E on opposite sides of the cover, but not necessarily attached to it. In these are secured the ends of the wires, loops, or bails F, which are adapted to be turned under the rounded bottom of the bowl from opposite sides, and another loop or bail H is adapted to serve as a handle for lifting the cover or the complete utensil, as the case may be.

It is ordinarily the custom to form the bowl or vessel and the disk or plate J from glazed earthenware or similar material, and the cover, loops, or bails of metal, or the bowl and cover may both be of earthenware, metal, enameled, or other ware to suit various requirements; and many changes in and modifications of the construction herein described may be made without departing from the spirit of my invention or sacrificing its advantages.

The operation will be readily understood in view of the foregoing description, when taken in connection with the accompanying drawings, by those familiar with this class of devices and the object for which they are intended.

Having fully described my invention, its construction and operation, I claim as new and desire to secure by Letters Patent—

1. In an article of manufacture, a cooking utensil having an externally-convex bowl, said bowl having sides slightly tapering, a ring-flange having openings therein secured to the under side of said bowl, a handle integral with said flange, a plate adapted to fit over said bowl, a cylindrical-shaped cover having one end closed and being provided with a screw-thread on its inner face, a corresponding and engaging thread on the outer upper edge of said bowl, ears on said cover, bails fitting in said ears adapted to engage on opposite sides said bowl and a handle likewise engaging said ears, all of said parts being combined substantially as described.

2. As an article of manufacture, a cooking utensil having a bowl of externally-convex, slightly-tapering-sided form, a ring-flange having serrations or openings secured to the under portion of said utensil, a handle engaging said flange, a plate adapted to snugly fit over said bowl, and a cylindrical-shaped cover having one end closed and being adapted to fit over said utensil, all of said parts being combined substantially as specified.

3. As an article of manufacture, a cooking utensil having an externally-shaped convex bowl, said bowl having sides slightly tapering, a ring-flange having serrations or channels therein secured to the under side of said bowl, a handle engaging said flange, a plate adapted to fit over said bowl, a cylindrical-shaped cover having one end closed and adapted to fit over said utensil and means for securing said cover to said utensil, ears on said cover, bails fitting in said ears adapted to engage on opposite sides said bowl and a handle likewise engaging said ears, all of said parts being combined substantially as described.

In testimony that I claim the foregoing as my invention I have signed my name, in presence of the subscribing witnesses, this 19th day of November, 1895.

CHARLES EBENEZER CHALLIS.

Witnesses:
ALFRED NUTTING,
THOMAS P. ROGERS.